United States Patent [19]
Setzer

[11] Patent Number: 4,800,865
[45] Date of Patent: Jan. 31, 1989

[54] PORTABLE COOKING DEVICE

[76] Inventor: Michael W. Setzer, 19825 Terri Dr., Canyon Country, Calif. 91351

[21] Appl. No.: 158,947

[22] Filed: Feb. 22, 1988

[51] Int. Cl.[4] .............................................. F24C 1/00
[52] U.S. Cl. .................................. 126/21 R; 126/25 R; 126/39 D; 126/39 H; 99/401; 99/422; 99/481
[58] Field of Search ................. 126/19 R, 21 A, 21 R, 126/25 R, 27, 29, 37 A, 39 D, 39 H, 39 J, 39 K, 214 A, 214 C, 214 D, 218, 220, 299 R, 51, 275 R; 99/401, 422, 481

[56] References Cited

U.S. PATENT DOCUMENTS

| 167,237 | 8/1875 | Gates | 126/275 R |
|---|---|---|---|
| 385,348 | 7/1888 | Geisel | 126/275 R |
| 1,342,455 | 6/1920 | Monihan | 126/275 R |
| 1,463,061 | 7/1923 | Pawlick | 126/275 R |
| 1,830,063 | 11/1931 | Jungers | 126/19 R |
| 1,916,297 | 7/1933 | Bright | 126/275 R |
| 1,940,451 | 12/1933 | Noble | 126/275 R |
| 2,920,615 | 1/1960 | Vacval | 126/275 R |
| 3,035,568 | 5/1962 | Dama et al. | 126/275 R |
| 3,036,192 | 5/1962 | Fry | 219/391 |
| 3,266,483 | 8/1966 | Keel | 126/275 R |
| 3,270,740 | 9/1966 | Koos, Jr. | 126/275 R |
| 4,029,463 | 6/1977 | Johansson et al. | 126/21 A |
| 4,051,837 | 10/1977 | Norman | 126/9 R |
| 4,109,636 | 8/1978 | Burge | 126/21 A |
| 4,180,049 | 12/1979 | Carr et al. | 126/21 A |
| 4,386,558 | 6/1983 | Holman et al. | 99/401 |
| 4,492,216 | 1/1985 | Dumont | 126/21 A |
| 4,585,923 | 4/1986 | Binder | 126/21 A |
| 4,635,615 | 1/1987 | Itoh et al. | 126/21 A |
| 4,640,265 | 2/1987 | Romo | 126/19 R |
| 4,648,377 | 3/1987 | Van Camp | 126/21 A |

FOREIGN PATENT DOCUMENTS

| 122842 | 9/1948 | Sweden | 126/21 R |
|---|---|---|---|

*Primary Examiner*—Samuel Scott
*Assistant Examiner*—Noah Kamen
*Attorney, Agent, or Firm*—Kenneth J. Hovet

[57] ABSTRACT

The cooking assembly directs initial hot gases from a heat source against a heat semiconductive base. It then guides the gases to flues behind partitions that define sides of a cooking chamber. The gases flow over the partitions, down past food to be cooked, and then out vents. A uniform temperature distribution is achieved in the cooking chamber. The cooking assembly can be a barbecue cooker.

27 Claims, 6 Drawing Sheets

PORTABLE COOKING DEVICE

BACKGROUND OF THE INVENTION

1. Field of the Invention

The present invention relates to cooking devices and, more particularly, to portable cooking assemblies for use with external heating means.

2. Description of the Prior Art

U.S. Pat. Nos. 1,342,455; 2,920,615 and 3,270,740 disclose portable oven devices wherein hot gases flow beneath and around food items to be heated and then out side or upper vent outlets. Particularly with respect to external heat sources, it is detrimental to permit gases at their hottest temperature to make initial contact with the food items. This creates uneven cooking, possible charring and drying of the item. It is also an inefficient use of the heating means.

The camp stove toaster of U.S. Pat. No. 3,266,483 seeks to overcome the above problems by providing a cooking chamber that is heated entirely by indirect conductive heat. A U-shaped double walled housing is used to form a passageway for hot gases from a heat source. Again, however, the chamber bottom gets the hottest gases and the top portion the coolest. This sets up a significant temperature gradient and results in uneven cooking. Also, no means are provided to circulate air in an attempt to more evenly distribute the air temperature.

U.S. Pat. No. 3,035,568 discloses a portable oven which also relies on indirect conduction heating. Heat applied to a base plate flows by conduction and radiation to an offset cooking platform. The platform has dimpled edges and is spaced from the oven cover to allow convention air to rise from the base plate past the platform. No exhaust vents are provided nor are any air deflectors used to create a uniformity of temperature. As such, there is virtually no control over the temperature surrounding the platform. Also, the platform itself may become unnecessarily hot relative to the ambient air. Especially when covered by a food item.

SUMMARY OF THE INVENTION

The cooking assembly of the present invention directs initial hot gases from a heat source against a heat semi-conductive base. It then guides the gases to flues behind partitions that define the sides of a cooking chamber. The gases flow over the partitions and downwardly past a food item in the chamber. They exhaust through lower level vent means. Having upper level gas inlets and lower outlets provide for natural continuous flow of heated air by convection. Such flow insures a uniform temperature distribution within the cooking chamber and avoids the initial impact of hot gases direct from the heat source.

The heat semi-conductive base serves to deflect the initial hot gas flow to the flues while also distributing the heat therefrom by conduction. With the above heat transfer mechanisms, the cooking chamber performs in a highly efficient manner and thereby conserves energy. It also provides a superior cooking environment by having a controllable and uniform temperature distribution throughout the chamber.

DESCRIPTION OF THE PREFERRED EMBODIMENTS

Figure 1:
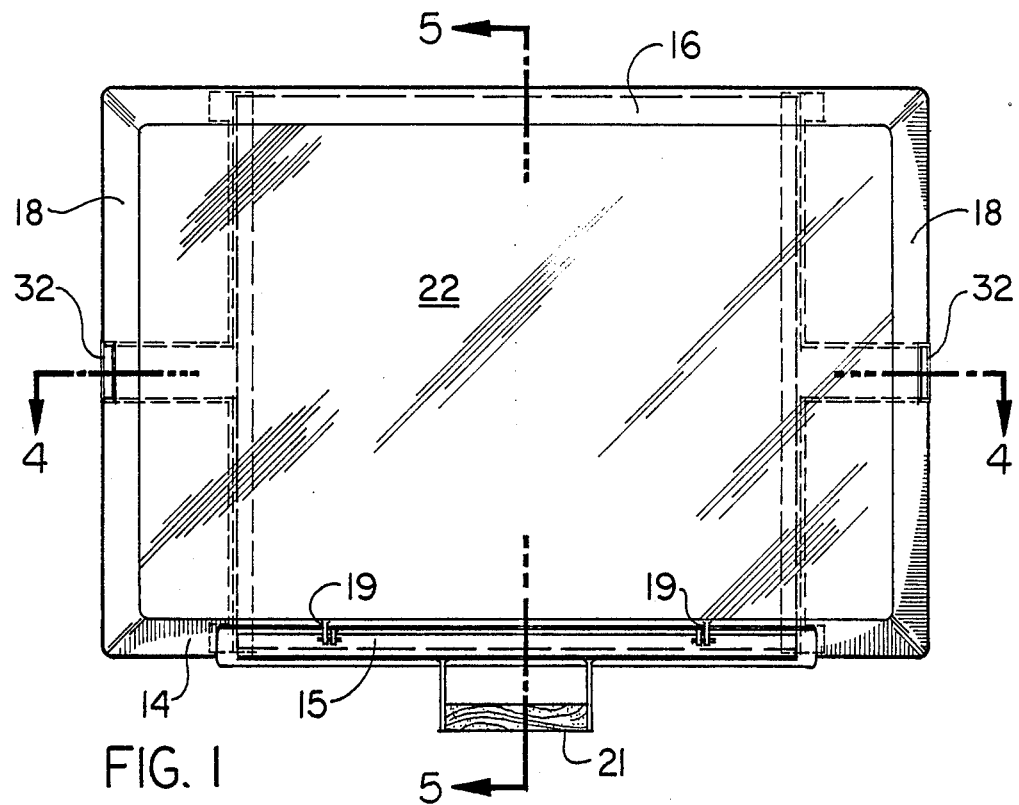
FIG. 1 is a top plan view of a portable cooking device constructed in accordance with the present invention.

With reference now to FIGS. 1-6 of the drawings, an illustrative embodiment of the invention is shown by numeral 10. An enclosure 12 is provided having a thin-walled flat surfaced structure constructed of metal such as porcelain steel or aluminum. It is characterized by front wall 14 and back wall 16 which are connected by opposing side walls 18. The walls incline upwardly from a bottom peripheral edge 20 and merge with a top wall 22.

The front wall may include an optional door and/or glass viewing means 13. As shown, a glass door 15 is used over front wall opening 17. The door pivots about hinges 19,19 with handle 21 and permits easy access to the enclosure interior.

A function of the enclosure is to capture hot gases from an external heat source. It is contemplated that a likely source would be the heating means F of a conventional gas barbecue unit common to most households. As such, peripheral bottom edge 20 most preferably defines an open bottom that will overlie and cover at least a major portion of the barbecue housing open top. Since most barbecue housings have a rectangular-shaped open top, bottom edge 20 should likewise define a rectangular-shaped open bottom. Other shapes may also be used.

Figure 2:
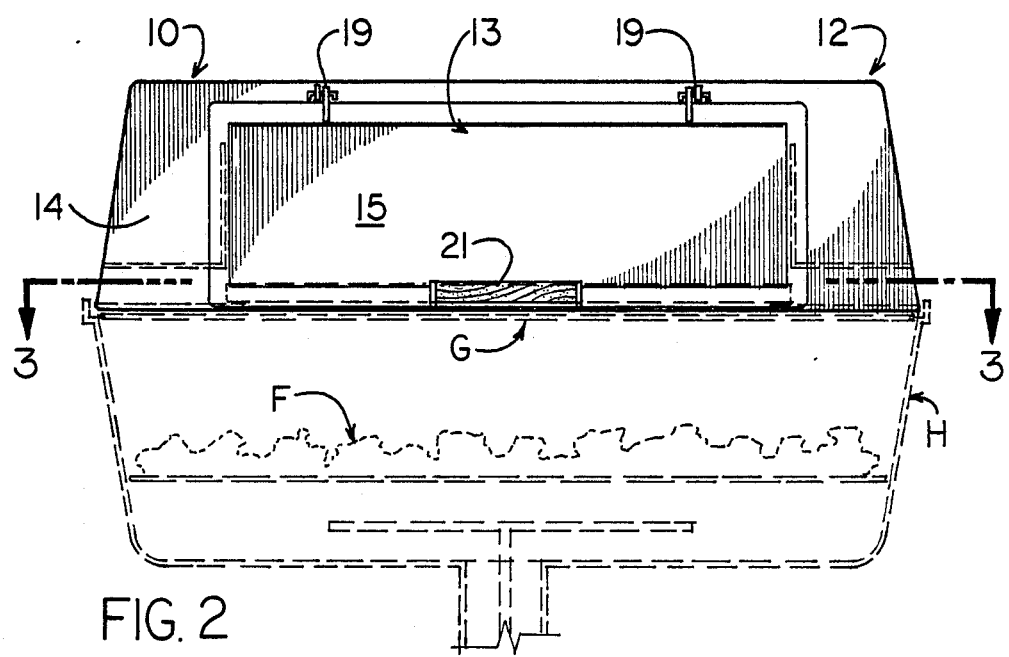
FIG. 2 is a front elevational view of the device shown in FIG. 1 positioned upon a gas barbecue unit shown in phantom.
Figure 3:
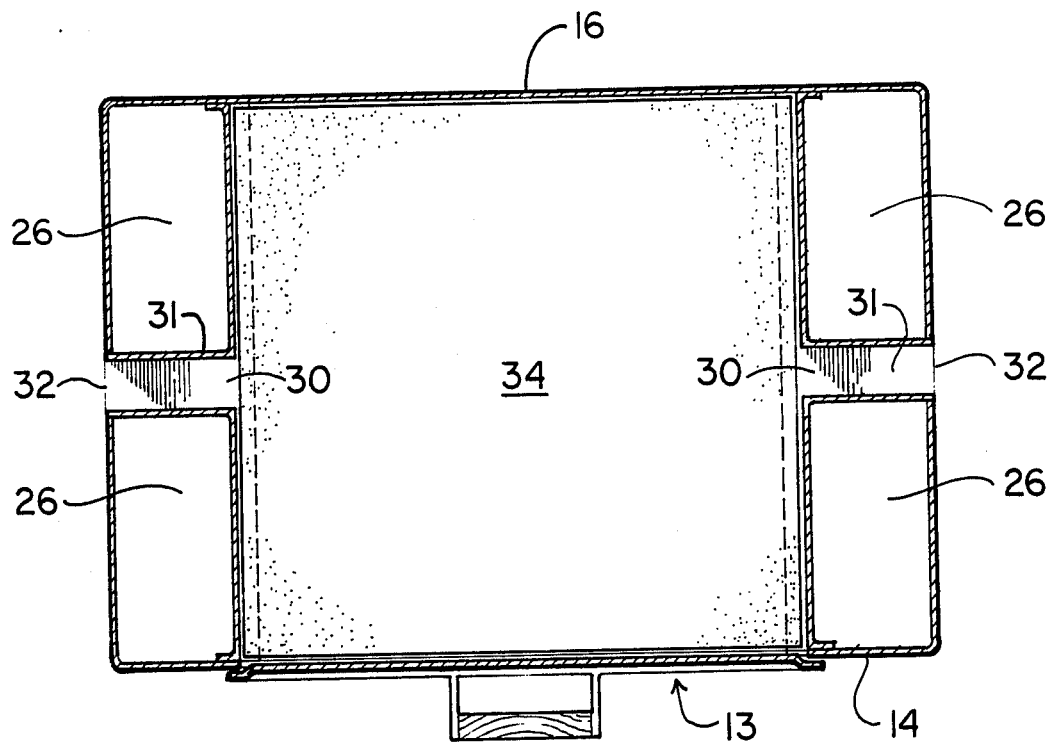
FIG. 3 is a cross-sectional view taken along lines 3—3 of FIG. 2.

With reference to FIG. 2, it is expected that enclosure bottom edge 20 will rest upon grating G which is set over the open top of housing H of a typical gas barbecue unit. The interior cooking assembly, shown generally by reference 23, will also be supported by the grating. The barbecue housing and enclosure cooperate to entirely enclose the assembly during the cooking operation.

The interior cooking assembly illustrated in FIGS. 1–6 and 10 comprises a base 34 having a partition 24 upstanding from each opposing end thereof. The base length is less than the enclosure length to provide open flue areas 26 between each partition and respective side wall. Base width would approximate the enclosure width so that most all hot gases from the underlying heat source F will be deflected into the flue areas.

Base 34 is constructed of material that is only semi-conductive of heat. This inhibits localized hot spotting from the underlying heat source. Thickened plates of marble or ceramic material are preferred because they also provide a durable non-oxidizing surface suitable for direct contact with food items such as pizza crusts.

Partitions 24,24 are preferably coextensive with the base width and span the enclosure between front wall 14 and back wall 16. It is desirable to center the base over barbecue housing H so that the partitions are equidistant from respective side walls 18,18. In this way, the flue areas will be equal and permit a balanced flow of hot gases about both sides of the enclosure.

As shown in the FIGS. 1–6 embodiment, the partitions may include opposing side flanges 27,27. These help facilitate partition juncture with the front and back walls. Such juncture may be a fixed attachment whereby assembly 23 will be part of the enclosure. Alternatively, the interior assembly may be a separate entity for use with a separate enclosure or within existing barbecue cover and housing units as shown in FIGS. 8–10 and 14–16. In such case, the partitions may be without side flanges 27,27 as depicted in FIG. 10.

Each partition terminates at an upper edge 25. The upper edges are spaced-apart from top wall 22 a predetermined distance to form open areas. Such areas function as hot gas inlets 28 to direct gases from the flues into a cooking chamber 36. The cooking chamber is defined as the area above base 34 between the partitions and between the front and back walls.

The lower portion of each partition further includes a base support means shown as inwardly directed base flange 29. In the simplest construction, opposing ends of base 34 will rest by gravity upon a respective base flange of each partition. Optionally, the base support means may include a clamping device or permanent attachment means such as bolt fasteners. In this way the partition and base would be a unitary assembly.

Also located in the lower portion of each partition are vent means shown as a cool gas outlet 30. The outlet is adjacent base 34 and functions to permit cooled gases to exhaust the cooking chamber. In the FIGS. 1–6 embodiment, ducts 31 are used to carry the gases across the open flue areas to an enclosure outlet 32.

Figure 4:
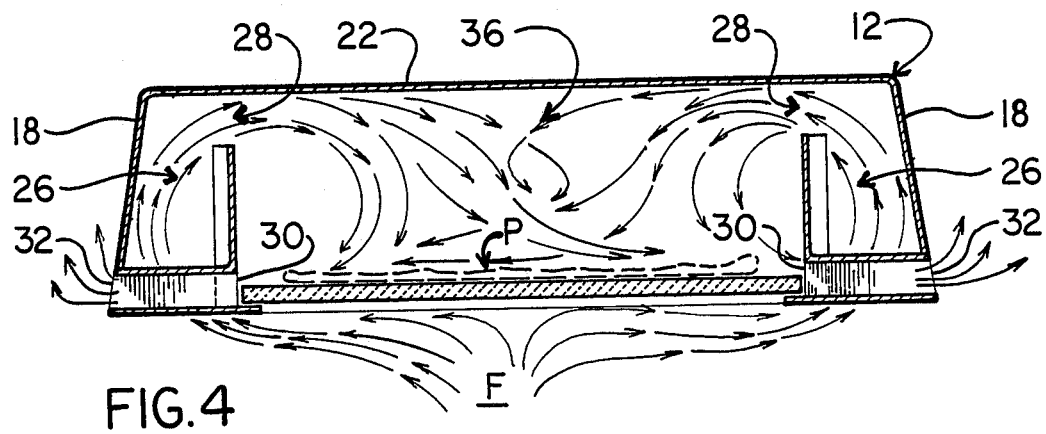
FIG. 4 is a cross-sectional view taken along lines 4—4 of FIG. 1.
Figure 5:
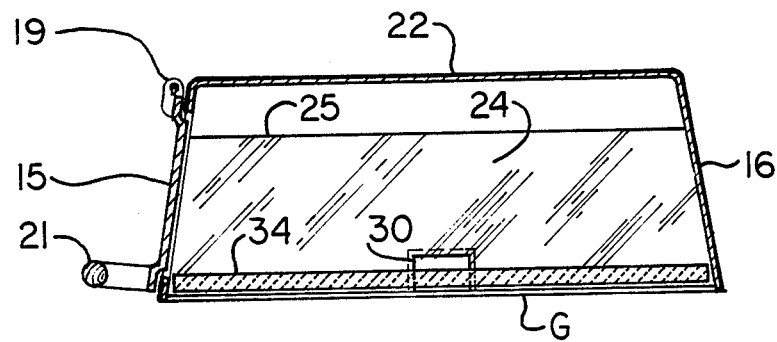
FIG. 5 is a cross-sectional view taken along lines 5—5 of FIG. 1.
Figure 6:
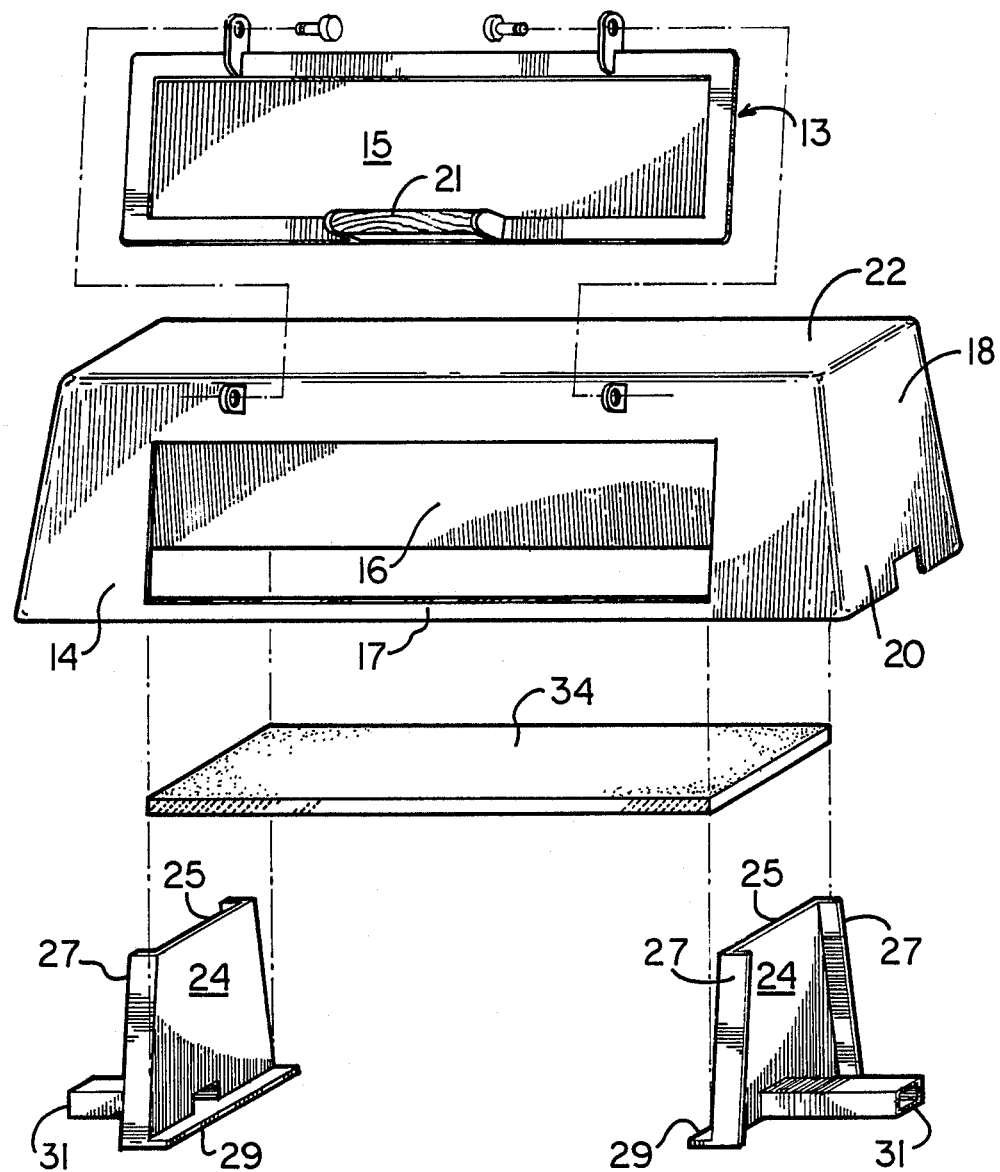
FIG. 6 is an exploded front perspective view of the device of FIG. 1.

As best seen by the arrows in FIG. 4, the above-described cooking assembly provides for convection flow of hot gases over the food item P being cooked. The gases cool and become denser as they flow through the chamber and across the item. The outlets, being located adjacent base 34, allow the lower cooled gases to exit the chamber to create a natural circulatory gas flow.

Simultaneous with the above convection flow, the heat semi-conductive nature of base 34 readily deflects the underflow of hot gases while slowly conducting only a portion of the gaseous thermal energy. The resultant temperature gradient across the base thickness is significant and functions to eliminate unwanted hot spots at the base cooking surface. It does allow, however, the attainment of an effective base surface cooking temperature. This is especially advantageous for foodstuffs with crusts such as pizzas. With the above system, hot gases continuously flow over the pizza top to melt the cheese particles while a cooler base surface allows for cooking of the underlying crust without burning or dryness.

Figure 7:
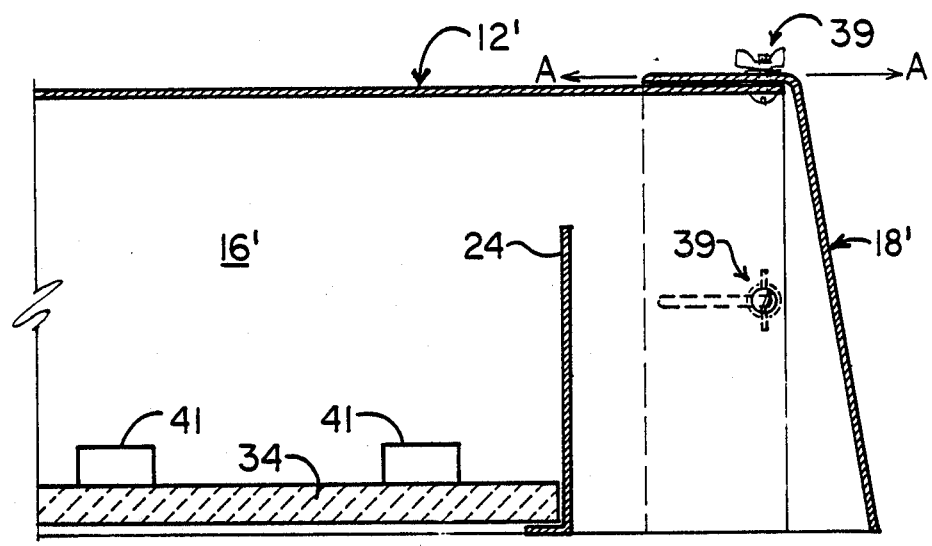
FIG. 7 is an enlarged fragmentary cross-sectional view of an alternative enclosure showing adjustable side walls and back wall vents.

The invention contemplates variations of the enclosure and also the interior cooking assembly to accomodate different sizes and models of barbecue units. It has been found that most commonly available barbecue units vary in length (side wall to side wall) rather than width. As such, FIG. 7 illustrates enclosure 12' which has wall adjustment means shown as adjustable side walls 18'. Side wall slot and wingnut combinations 39 allow the side walls to move in or out, as shown by arrows A, to overlie different lengths of barbecue housings. With the above variation, vent means shown as exhaust outlets 41 may be used in place of the vent ducts. Such outlets extend through back wall 16' adjacent base 34.

Figure 11:
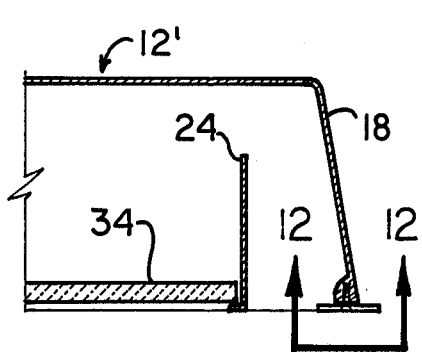
FIG. 11 is a fragmentary cross-sectional view of an alternative enclosure showing an adjustable side wall baffle means.
Figure 13:
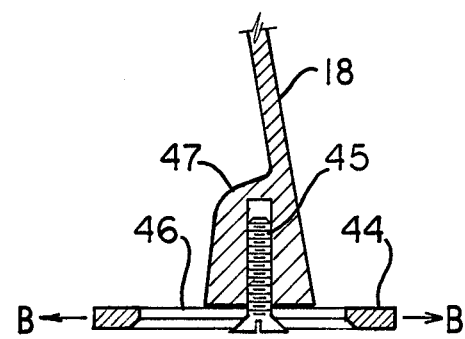
FIG. 13 is an enlarged cross-sectional view taken along lines 13—13 of FIG. 12.
Figure 12:
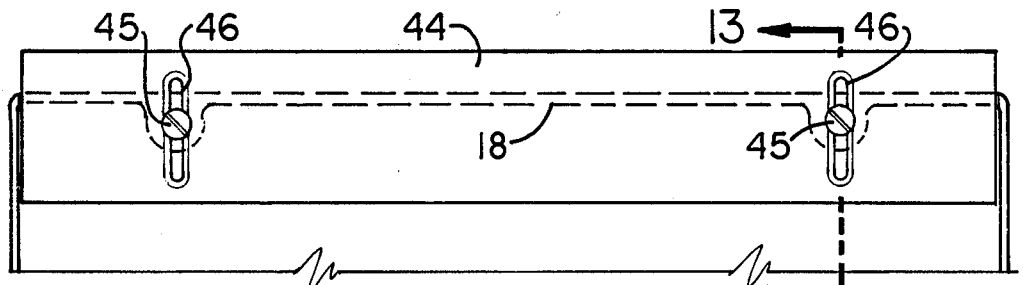
FIG. 12 is a bottom plan view taken along lines 12—12 of FIG. 11.

Alternatively, FIGS. 11–13 illustrate a different wall adjustment means shown as sliding baffle 44. The baffle is used to overlie portions of a barbecue grate not covered by the enclosure. In this embodiment, fasteners 45 extend through baffle slots 46 and adjustably secure the baffle to spaced-apart bosses 47 on side wall 18. The baffles may be on either or both of the opposing side walls. They move laterally as shown by arrows B in FIG. 13 to prevent heat loss and deflect the hot gases into the flues 26.

Although not specifically shown, it will be appreciated that both of the above-described wall adjustment means could be used with back wall 16. This would allow the enclosure to accommodate variations in barbecue width.

Figure 9:
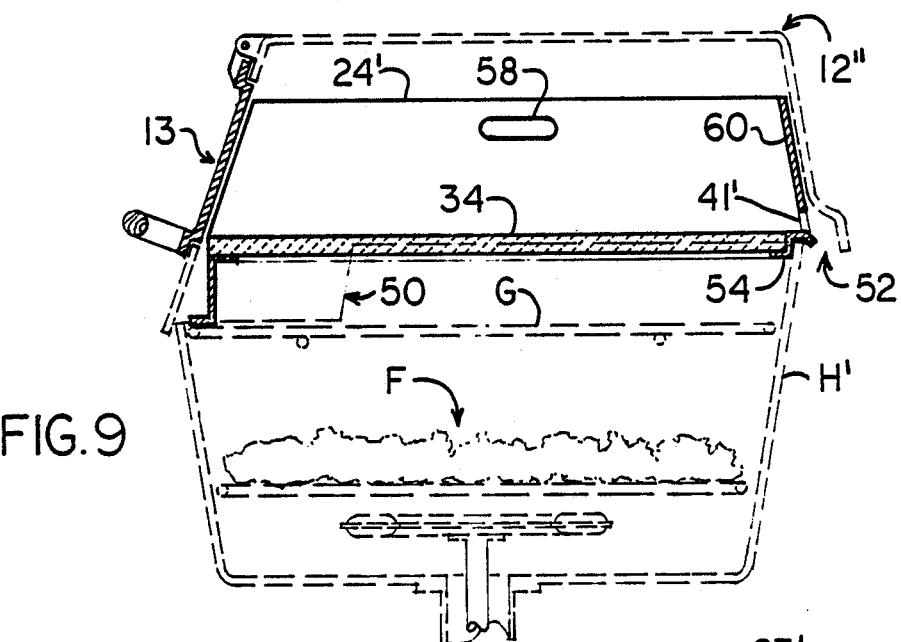
FIG. 9 is a cross-sectional view taken along lines 9—9 of FIG. 8.
Figure 8:
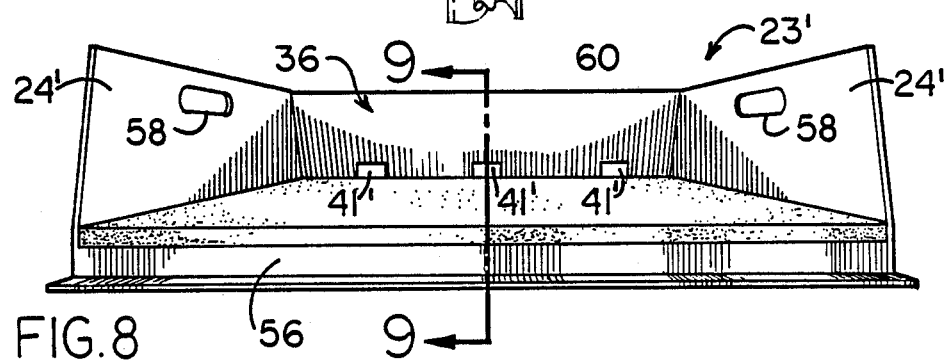
FIG. 8 is a perspective view of an alternative interior cooking assembly for use within a barbecue unit shown in phantom.
Figure 10:
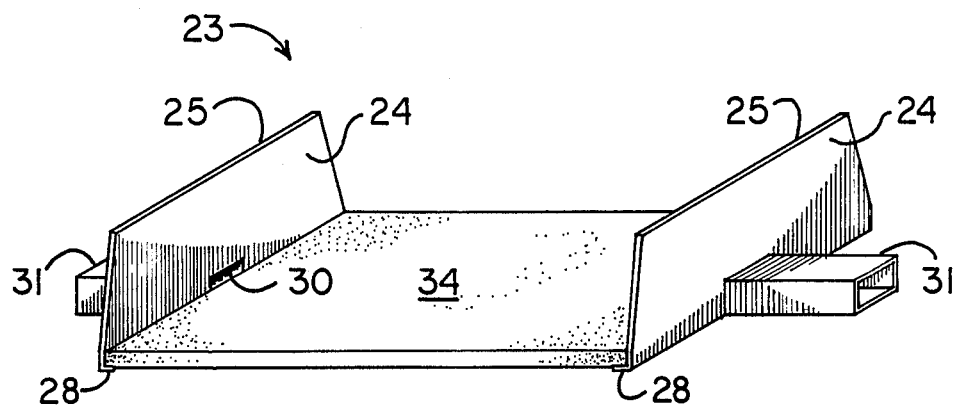
FIG. 10 is a perspective view of an interior cooking assembly similar to that shown in FIG. 1.

With reference to FIGS. 8 and 9, a modified interior cooking assembly 23' is illustrated for use with barbecue units having a profiled housing H'. As shown, such housings typically include an open top with a front cut-out portion 50. Enclosures 12" for the above housings commonly have back wall vent systems shown as offset vent opening 52. To position the base adjacent the vent opening, a rear lip flange 54 is used to support the base back end portion on the barbecue housing back edge.

A front pedestal flange 56 supports the base front end portion upon grating G. The pedestal flange has sufficient height to support the base in a level manner between partitions 24'. For convenience, the partitions may include handle means shown as hand openings 58.

To facilitate an even distribution of hot gases and a controlled exit of cooled gases, a back partition 60 may be used. The back partition connects with side partitions 24' to form a 3-sided cooking chamber 36. It includes exhaust outlets 41' which are adjacent base 34. The outlets communicate with the offset vent opening 52 for exiting the cooled gases in a natural convection fashion.

Figure 14:
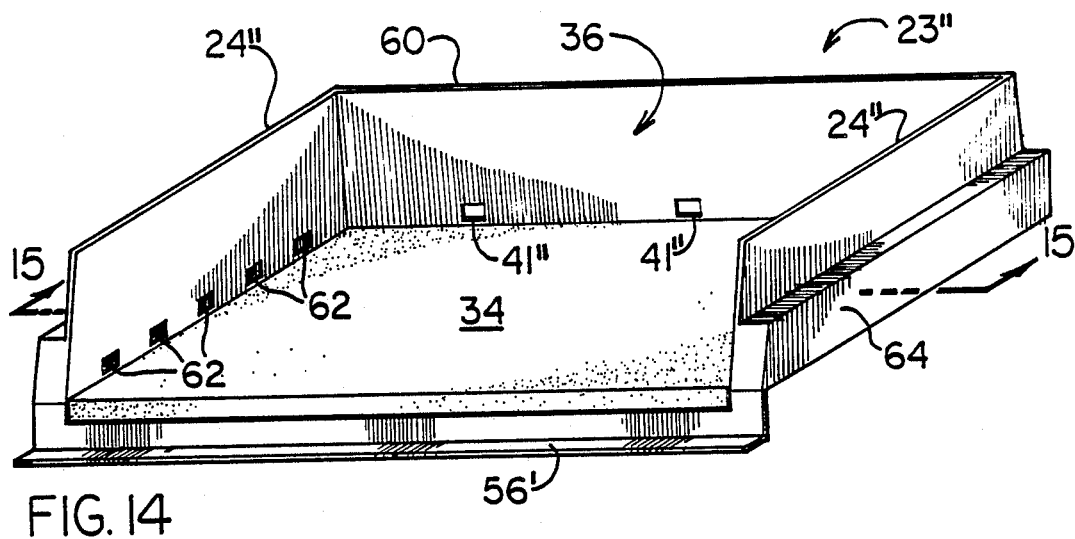
FIG. 14 is a perspective view of another alternative interior cooking assembly with a back partition.
Figure 15:
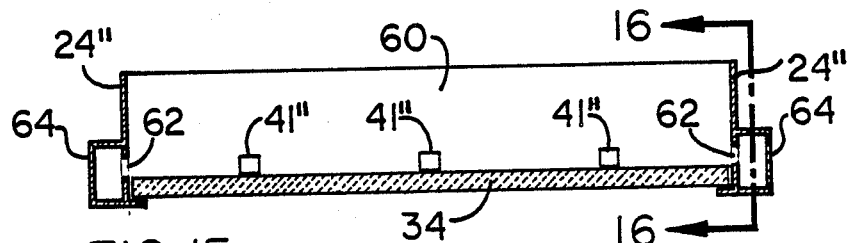
FIG. 15 is a cross-sectional view taken along lines 15—15 of FIG. 14.
Figure 16:
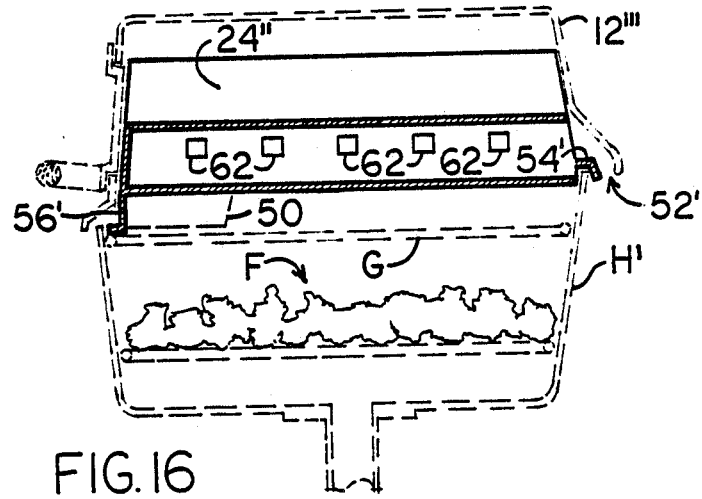
FIG. 16 is a cross-sectional view taken along lines 16—16 of FIG. 15 set within a barbecue unit shown in phantom.

FIGS. 14–16 illustrate a cooking assembly 23" similar to the FIGS. 8–9 embodiment, but with additional venting means. Base 34 is supported horizontally by rear lip flange 54' and front pedestal flange 56'. As before, the lip flange engages the housing back edge and the pedestal flange is supported by grating G. The back partition 60' forms a 3-sided cooking chamber with side partitions 24".

The venting means include exhaust outlets 41" which extend through the back partition and communicate with offset vent opening 52' of enclosure 12'''. The side partitions also include venting means shown as vent apertures 62. Such apertures extend through the lower portion of each side partition adjacent the base. They open into a side duct 64 which overlies the apertures on the outside of each partition.

The ducts form enclosed passageways which communicate with vent openings 52' for exhausting the cooled gases from cooking chamber 36. The above arrangement may be useful for larger capacity cooking assemblies or where greater circulation of gases are desired. Of course in the above and all other embodiments, temperature and gas flow is also controllable by regulation of the heat source.

While the invention has been described with respect to preferred embodiments, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

I claim:

1. A portable cooking means for use in conjunction with an underlying heat source comprising:
   an enclosure for capturing hot gases from said heat source, said enclosure being removable from said heat source and having an open bottom defined by a peripheral bottom edge, a front wall, a back wall, opposing side walls and a top wall;
   a partition spaced-apart from each side wall and extending between said front and back wall, said partition extending from a lower portion upwardly and terminating at an upper edge which is offset a predetermined distance below said top wall, the space between said top edge and top wall defining an upper level hot gas inlet;
   a base overlying said open bottom extending from between the lower portion of each partition and said front and back walls, the area above said base between the front and back walls and partitions defining a cooking chamber, the area between each side wall and respective partition defining an open flue for hot gases from said heat source; and,
   gas vents adjacent said base for removing gases from said cooking chamber.

2. The cooking means of claim 1 wherein said partitions extend upwardly from said bottom edge at respective opposing junctions with said front and back walls.

3. The cooking means of claim 2 wherein opposing junctions for each partition are equidistant from each respective side wall and the upper edge of each partition is equidistant from the top wall.

4. The cooking means of claim 2 wherein said partitions are parallel to each other and opposing junctions are coextensive.

5. the cooking means of claim 2 wherein the respective flues and hot gas inlets for each partition are substantially equal in area.

6. The cooking means of claim 2 wherein said gas vents comprise ducts extending across said flues, said ducts having an inlet at said partition and an outlet at said side wall.

7. The cooking means of claim 1 wherein said base is retained by retention means on said partitions.

8. The cooking means of claim 7 wherein said retention means comprise flanges extending from said partitions.

9. The cooking means of claim 7 wherein said base comprises a ceramic plate and said retention means comprises a flange extending from the lower portion of said partition.

10. In combination, a heating means within a housing having an open top;
    an enclosure removably overlying at least a major portion of said open top, said enclosure having an open bottom defined by a peripheral edge with opposing side walls connected by a front wall and a back wall which extend upwardly from said edge to a top wall;
    a partition spaced inwardly from each side wall extending across the width of said enclosure between said front and back walls and upwardly from an area proximate the plane defined by said peripheral edge to a top edge offset from said top wall, the area between said top edge and said top wall defining an upper level hot gas inlet:
    a base proximate said plane which extends over the area between said partitions and between the front and back walls; and,
    vent means adjacent said base for exhausting cooled gases.

11. The combination of claim 10 wherein said partition includes retention means for retaining said base.

12. The combination of claim 10 wherein said partitions are parallel to each other and spaced equidistance from a respective adjacent side wall.

13. The combination of claim 12 wherein the partition top edges are coextensive and spaced an equal distance from said top wall.

14. The combination of claim 13 wherein said opposing side walls, front and back walls are generally flat and incline inwardly from said peripheral edge to said top wall.

15. The combination of claim 13 wherein said partitions are fixed to said front and back walls.

16. The combination of claim 15 wherein said front wall includes an access opening and a door means overlying said opening.

17. The combination of claim 10 wherein said vent means comprises an inlet in said partition and an outlet in an adjacent side wall connected by an enclosed passageway.

18. The combination of claim 10 wherein the peripheral edge of said side walls or back wall include a sliding baffle.

19. The combination of claim 10 wherein said side walls are movable relative to said partitions to enlarge the area of said open bottom.

20. The combination of claim 19 wherein said vent means comprise openings through said back wall.

21. In combination, a barbecue unit comprising a housing having a top opening and a heating means within said housing with an enclosure removably overlying said top opening having a vent opening, said enclosure defined by front and back walls, opposing side walls and a top wall; and,
    a cooking assembly comprising a heat semi-conductive base positioned over said top opening having opposing end portions with a partition extending upwardly from each end portion, each partition being spaced-apart from a respective side wall to define a flue for hot gases from said heating means, each partition terminating at a top edge which is spaced-apart from said top wall to define an upper level hot gas inlet into the area above said base and between said partitions.

22. The combination of claim 21 wherein said base is located adjacent said vent opening for exhausting gases from said area.

23. The combination of claim 21 including vent means in said partitions communicating with said vent opening to exhaust gases from said area.

24. The combination of claim 23 wherein said vent means comprise apertures through said partitions adjacent said base; and, side ducts forming passageways for exhaust gases between said vent opening and said apertures.

25. The combination of claim 21 wherein said housing top opening has a back edge and includes a grating, said base including a front end portion having a pedestal flange supported on said grating and a back end portion having a lip flange supported on said back edge.

26. The combination of claim 21 wherein said base has a back end portion and including a back partition extending upwardly from said back end portion having vent means in communication with said vent opening.

27. The combination of claim 26 wherein said back partition is adjacent said enclosure back wall and said vent means comprise exhaust outlets through said back partition adjacent said base.

* * * * *